UNITED STATES PATENT OFFICE.

JOHN CHILCOTT, OF BROOKLYN, NEW YORK.

COMPOSITION FOR COATING STEAM PIPES, BOILERS, &c.

Specification forming part of Letters Patent No. 44,517, dated October 4, 1864; antedated September 19, 1864.

*To all whom it may concern:*

Be it known that I, JOHN CHILCOTT, of 70 Fulton street, in the city of Brooklyn, in the county of Kings and State of New York, have invented a new and useful composition, to be used as a non-conductor of heat, for coating the exteriors of steam-pipes, the upper or exposed portions of steam-boilers, and other surfaces to which the application of a non-conductor or poor conductor of heat may be desirable; and I do hereby declare that the following is a full, clear, and exact statement of the component parts of and manner of compounding and applying the same.

This composition consists of calcined gypsum, silica, and coal-tar pitch, either with or without hair. The coal-tar pitch may be the residuum which is left from the distillation of coal-tar, or be collected from the interiors of the exit-pipes of gas-retorts. The proportions, by weight, of the several ingredients by which, all things considered, I have obtained the best results are as follows: calcined gypsum, (plaster-of-paris,) fifty (50) parts; silica, (in powder,) fifty (50) parts; coal-tar pitch, twelve (12) parts. When hair is added I propose generally to use about five (5) pounds, by weight, to the above specified quantities of the other substances.

The composition may be prepared and used in various ways. The best mode of preparing is to melt the pitch by heating it in a suitable vessel, and adding the gypsum and silica and a sufficient quantity of "pitch-oil" obtained by a second distillation of coal-tar after the naphtha has been obtained to reduce it to a semi-fluid state, in which it can be easily worked, and to stir the whole until thoroughly mixed. It may then be applied to the surfaces to be coated with a trowel or other suitable instrument, and by the evaporation of the pitch-oil it will quickly assume a moderate degree of hardness, becoming harder in time.

Another mode of preparing the composition which will answer well when the surfaces to which it is to be applied are in a highly-heated state is to grind the pitch to powder, add the silica and gypsum and a suitable quantity of water to make a stiff mortar, and then apply the mixture to the heated surfaces with a trowel or other instrument. The heat of the surfaces will quickly evaporate the water, and by melting the pitch will produce the incorporation with it of the silica and gypsum.

When the surface to which the composition is to be applied is heated, and is nearly flat and horizontal, the silica and gypsum may be mixed with the powdered pitch and the whole applied in a dry state to the surface, and will become incorporated by the melting of the pitch by the heat of the surface.

It will be better, in most cases, to prepare the surfaces for the reception of the composition with a coating of melted coal-tar pitch reduced with a small quantity of pitch-oil to a sufficient consistency to enable it to be applied with a brush.

This composition is of a very durable character. The pitch binds the silica and gypsum, which are both excellent non-conductors of heat. The mixture of gypsum and silica has a non-conducting property superior to either separate.

I do not confine myself to the precise proportions of the several ingredients herein specified, as these may be to some extent varied without materially altering the character of the composition; but

What I claim as my invention, and desire to secure by Letters Patent, is—

The non-conducting composition composed of silica, gypsum, and coal-tar pitch, with or without hair, substantially as herein described.

JOHN CHILCOTT.

Witnesses:
HIPPOLYTE MALI,
CHAS. E. FROST.